US006567718B1

(12) United States Patent
Campbell et al.

(10) Patent No.: US 6,567,718 B1
(45) Date of Patent: May 20, 2003

(54) METHOD AND APPARATUS FOR MONITORING CONSUMABLE PERFORMANCE

(75) Inventors: William J. Campbell, Austin, TX (US); Jeremy Lansford, Austin, TX (US); Michael R. Conboy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 341 days.

(21) Appl. No.: 09/627,874

(22) Filed: Jul. 28, 2000

(51) Int. Cl.[7] .............................................. G06F 19/00
(52) U.S. Cl. ......................... 700/121; 700/46; 700/173; 700/174; 700/175; 700/176; 700/177; 70/178; 451/54; 451/307; 451/10; 451/303
(58) Field of Search .................. 700/121, 46, 173–178; 451/54, 307, 40, 303

(56) References Cited

U.S. PATENT DOCUMENTS

| | | | | |
|---|---|---|---|---|
| 5,599,423 A | * | 2/1997 | Parker et al. ................ 700/121 |
| 5,934,974 A | * | 8/1999 | Tzeng ........................ 451/307 |
| 6,108,091 A | * | 8/2000 | Pecen et al. ................. 451/303 |
| 6,132,289 A | * | 10/2000 | Labunsky et al. ............. 451/6 |
| 6,146,248 A | * | 11/2000 | Jairath et al. ................ 451/10 |
| 6,169,931 B1 | * | 1/2001 | Runnels ...................... 700/121 |
| 6,179,688 B1 | * | 1/2001 | Beckage et al. ............... 451/6 |
| 6,230,069 B1 | * | 5/2001 | Campbell et al. ............ 700/121 |
| 6,231,428 B1 | * | 5/2001 | Maloney et al. .............. 451/41 |
| 6,293,845 B1 | * | 9/2001 | Clark-Phelps ................ 451/54 |
| 6,309,290 B1 | * | 10/2001 | Wang et al. ................. 451/398 |

* cited by examiner

*Primary Examiner*—John Follansbee
*Assistant Examiner*—Thomas Pham
(74) *Attorney, Agent, or Firm*—Williams, Morgan & Amerson, P.C.

(57) ABSTRACT

A method for monitoring consumable performance in a processing tool comprises storing a performance model of the processing tool; receiving a consumable item characteristic of a consumable item in the processing tool; determining a predicted processing rate for the processing tool based on the consumable item characteristic and the performance model; determining an actual processing rate of the processing tool; and determining a replacement interval for the consumable item based on at least the actual processing rate. A processing system includes a processing tool and an automatic process controller. The processing tool is adapted to process wafers and includes a consumable item.

38 Claims, 2 Drawing Sheets

METHOD AND APPARATUS FOR MONITORING CONSUMABLE PERFORMANCE

BACKGROUND OF THE INVENTION

1. Field of the Invention

This invention relates generally to semiconductor device manufacturing, and, more particularly, to a method and apparatus for monitoring consumable performance in a processing tool.

2. Description of the Related Art

The manufacture of most devices, such as semiconductor devices, requires a number of discrete processing steps to create the device. With respect to semiconductor devices, a number of discrete steps are needed to produce a packaged semiconductor circuit device from raw semiconductor material. The starting substrate is usually a slice of single crystal silicon referred to as a wafer. Circuits of a particular type are fabricated together in batches of wafers called "lots" or "runs". The fabrication process creates regular arrays of a circuit on the wafers of a lot. During processing, the individual wafers in a lot may go through individual processing steps one at a time or as a batch. At the completion of wafer processing, the wafers are tested to determine circuit functionality. Later, the wafers are cut to separated the individual integrated circuit devices, the functioning devices are packaged, and further testing is performed prior to use by the customer.

Various processing tools used in the production of the semiconductor devices employ consumable items that are gradually depleted over their service lives. This depletion affects the performance of the tool in which they are employed. Often, periodic adjustments to the operating recipes of the tools are required to compensate for the degraded performance of the tool. Generally, these adjustments increase the time required to process the wafers in the tool.

One particular tool employing consumable items is a chemical mechanical polishing (CMP) tool. In a CMP process, the upper surface of a layer previously formed on a wafer is planarized to ease formation of subsequent process layers. Chemical mechanical polishing typically uses an abrasive slurry disbursed in an alkaline or acidic solution to planarize the surface of the wafer through a combination of mechanical and chemical action. Generally, a CMP tool includes a polishing device positioned above a rotatable circular platen or table on which a polishing pad is mounted. The polishing device may include one or more rotating carrier heads to which wafers may be secured, typically through the use of vacuum pressure. In use, the platen may be rotated and an abrasive slurry may be disbursed onto the polishing pad. Once the slurry has been applied to the polishing pad, a downward force may be applied to each rotating carrier head to press the attached wafer against the polishing pad. As the wafer is pressed against the polishing pad, the surface of the wafer is mechanically and chemically polished. Both the polishing pad and the carrier heads are subject to gradual deterioration. This degradation gradually decreases the polishing rate of the CMP tool over the life of the pad and carriers. Eventually, a polishing pad may fail catastrophically and cease to polish entirely. To respond to this degradation, certain process parameters may be modified. For example, the polishing time parameter in the operating recipe of the CMP tool must be periodically increased over time. Additionally, the down force applied by the carrier heads may be varied. After a predetermined number of wafers have been polished or after a specified time interval, the polishing pad and/or carrier heads are replaced.

Another exemplary tool employing consumable resources is a sputtering deposition tool. A sputtering tool uses a metal source, commonly referred to as a target, and bombards the source with energized ions, causing particles of the metal to be displaced and deposited on the surface. Over time, characteristics of the target, such as surface porosity, change due to the repeated physical bombardment. As a result the deposition rate decreases over time, and the operating recipe of the sputtering tool is periodically updated to increase the deposition time over the life of the target. Generally, sputtering targets are replaced on fixed intervals, such as after processing a predetermined number of wafers. The actual degradation rate experienced by individual targets may vary. Replacement intervals are generally selected to account for nearly the worst case degradation rate. As a result, certain targets are replaced before their useful life has been exhausted. Certain sputtering targets, such as gold, are costly. Premature retiring of such expensive targets is inefficient. On the other hand, as the deposition time is increased to account for the degradation in the target, there may come a point where the deposition time in the sputtering tool affects the overall critical path of wafers in the processing line. At such a point, the costs saved by keeping the target in service may be negated by the costs incurred as a result of delays in the processing line. Additionally, with very long replacement intervals, the entire target can be depleted in places and require immediate replacement to maintain the quality and composition of the deposited metal. The use of a fixed replacement interval attempts to find a compromise balancing these concerns.

In both exemplary cases described above, and in others not mentioned, the performance of the consumable items affect the operation of the individual processing tool as well as the efficiency of the processing line in which they participate. The use of fixed replacement intervals for consumable items is not always an effective solution for optimizing tool and line efficiency.

The present invention is directed to overcoming, or at least reducing the effects of, one or more of the problems set forth above.

SUMMARY OF THE INVENTION

One aspect of the present invention is seen in a method for monitoring consumable performance in a processing tool. The method comprises storing a performance model of the processing tool; receiving a consumable item characteristic of a consumable item in the processing tool; determining a predicted processing rate for the processing tool based on the consumable item characteristic and the performance model; determining an actual processing rate of the processing tool; and determining a replacement interval for the consumable item based on at least the actual processing rate.

Another aspect of the present invention is seen in a processing system including a processing tool and an automatic process controller. The processing tool is adapted to process wafers and includes a consumable item. The automatic process controller is adapted to store a performance model of the processing tool, receive a consumable item characteristic of the consumable item in the processing tool, determine a predicted processing rate for the processing tool based on the consumable item characteristic and the performance model, determine an actual processing rate of the processing tool, and determine a replacement interval for the consumable item based on at least the actual processing rate.

BRIEF DESCRIPTION OF THE DRAWINGS

The invention may be understood by reference to the following description taken in conjunction with the accompanying drawings, in which like reference numerals identify like elements, and in which.

Figure 1:
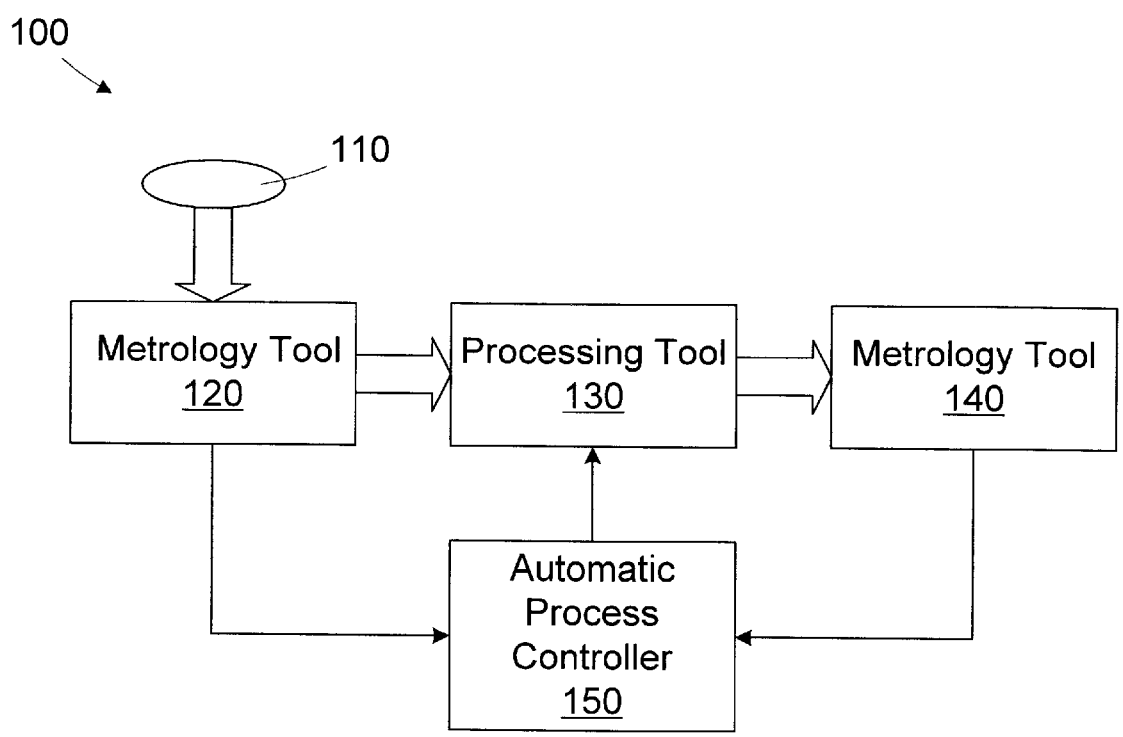
FIG. 1 is a simplified block diagram of a processing line in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a simplified diagram of a portion of an illustrative processing line 100 for processing wafers 110 in accordance with the present invention is provided. The processing line 100 includes a pre-process metrology tool 120, a processing tool 130, a post-process metrology tool 140, and an automatic process controller 150. The processing tool 130 employs a consumable item that exhibits degrading performance over time. Exemplary consumable items include polishing pads and carriers on a chemical mechanical polishing (CMP) tool and a target on a sputtering deposition tool. The above-identified examples of consumable items are not to be an exhaustive list, as the consumable item may vary depending on the process being performed, the process tool used to perform the process, the supplier of the consumable item, etc. The automatic process controller 150 interfaces with the processing tool 130 for modifying operating parameters of the processing tool 130 based on a model of the performance of the processing tool 130 over time. The metrology tools 120, 140 may be used to provide feedback to the automatic process controller 150 for updating the model and for monitoring the performance of the consumable items.

In the case where the processing tool 130 is a CMP tool, the pre-process metrology tool 120 may measure the thickness of the incoming layer, and the post-process metrology tool 140 may measure the thickness of the polished layer to determine the polishing rate of the processing tool 130. In the case where the processing tool 130 is a sputter deposition tool, the pre-process metrology tool 120 may be omitted, while the post-process metrology tool 140 may measure the thickness of the deposited layer to determine the deposition rate of the processing tool 130. The specific examples of processing tool 130 and consumable item types are provided for illustrative purposes. The application of the present invention is not so limited and may be applied to a variety of processing tools 130 employing consumable items.

The automatic process controller 150 contains a model of the performance of the processing tool 130 based on inputs such as the chronological age (e.g., time), service age (e.g., number of wafers, number of plasma minutes, etc.), initial consumable item characteristics (e.g., polishing pad thickness, CMP carrier film compressibility, sputtering target thickness), and characteristics of the processing tool 130 that influence consumable item degradation (e.g., CMP pad conditioning cut rate, percentage of diamond coverage on CMP conditioning wheel). This model may serve a dual purpose. First, the model may be used to automatically change the operating recipe of the processing tool 130 to account for expected degradation of the consumable item(s). Second, the model may be used to monitor the actual performance of the specific consumable item using the measurements provided by the metrology tools 120, 140. Specific monitoring of the consumable items allows for optimization of the replacement intervals based on actual performance rather than predicted performance. Along those lines, the model could also be employed to identify trends in the consumable item performance that may indicate a pending failure.

In the illustrated embodiment, the automatic process controller 150 is a computer programmed with software to implement the functions described. However, as will be appreciated by those of ordinary skill in the art, a hardware controller designed to implement the particular functions may also be used. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary software system capable of being adapted to perform the functions of the automatic process controller 150 as described is the ObjectSpace Catalyst system offered by ObjectSpace, Inc. The ObjectSpace Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

The automatic process controller 150 receives a consumable age input, either manually from an operator or automatically from monitoring the processing tool 130. Based on the input parameters, the automatic process controller 150 consults a model of the performance of the processing tool 130 to determine appropriate operating recipe parameters to account for expected variations in the processing rate of the processing tool 130. The automatic process controller 150 may also receive metrology data from the metrology tools 120, 140. A discrepancy between the actual processing rate and the predicted processing rate may indicate a difference in the actual degradation rate of the particular consumable item being employed. This discrepancy might indicate a premature failure or an opportunity for extending the service life of the consumable item. In the case where the actual processing rate differs from the expected processing rate, the automatic process controller 150 may opt to use the actual processing rate to determine the operating recipe parameters as opposed to the results from the model.

The performance model of the processing tool may be generated by the automatic process controller 150, or alternatively, the model may be generated by a different processing resource (not shown) and stored on the automatic process controller 150 after being developed. The model may be developed using the process tool 130 or on a different tool (not shown) having similar operating characteristics. For purposes of illustration, it is assumed that the performance model is generated and updated by the automatic process controller 150 based on actual performance of the processing tool 130 as measured by the metrology tools 120, 140. The performance model is trained based on historical data collected from numerous processing runs of the processing tool 130 over the consumable life cycle (i.e., the time between consumable replacements). Changes in the characteristics of the processing tool 130 and how they affect its operation are derived from the historical data to generate the model. Various modeling techniques, well known to those of ordinary skill in the art, are suitable. Exemplary modeling techniques include neural network modeling, principal component analysis (PCA), and projection to latent structures (PLS). Alternatively, a simple linear or non-linear regressive model may be developed. The specific implementation of the model may vary depending on the modeling technique selected, and such specific implementation is well known to those of ordinary skill in the art. Thus, for clarity and ease of illustration, such specific details are not described in greater detail herein.

Once the model is sufficiently trained, it may be used in a production environment to predict the operation of processing tool 130 based on current input values. In the production environment, periodic measurements from the metrology tools 120, 140 are provided as feedback to the automatic process controller 150 for updating the performance model.

In one embodiment, the automatic process controller may also receive scheduling information indicative of the role of the processing tool 130 in the critical path of the processing line 100. For example, by monitoring the idle time experienced by the processing tool 130 between lots, the automatic process controller 150 can gauge whether the processing tool 130 is a bottleneck in the overall processing line 100. A large idle time would indicate that the processing tool 130 is not a bottleneck, and the automatic process controller could opt to extend the service life of the consumable item, resulting in an increased, but tolerable, processing time. On the other hand, if the idle time is lower, the automatic process controller 150 could recommend replacement in lieu of processing time expansion. Such a recommendation could be subject to operator intervention or oversight to prevent simplicities in the model from causing errant recommendations. An operator, when notified of a potential bottleneck, could evaluate the cost of the consumable item versus its actual role in determining the critical path of the processing line 100.

Figure 2:
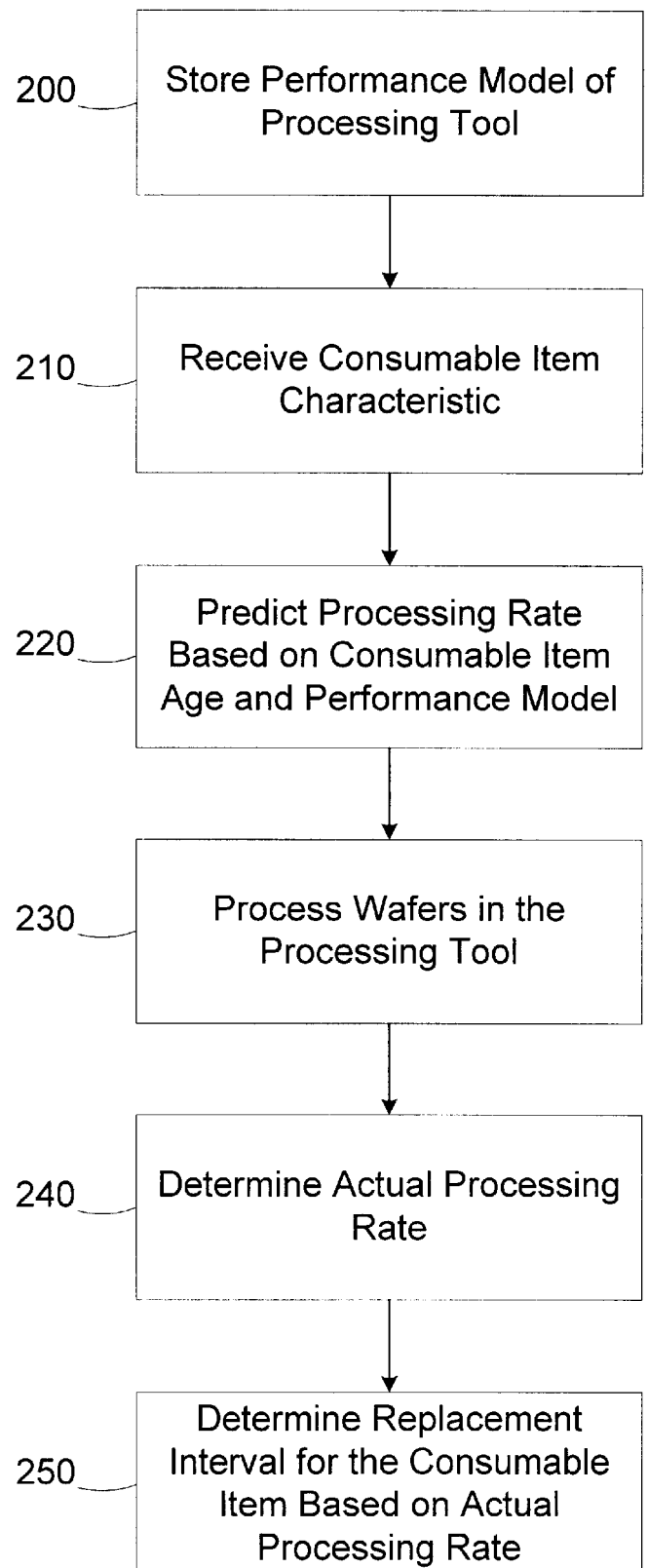
FIG. 2 is a flow diagram of a method for monitoring consumable performance in accordance with one aspect of the present invention.

Referring now to FIG. 2, a flow diagram of a method for monitoring consumable performance in accordance with one illustrative embodiment of the present invention is provided. In block 200, a performance model of the processing tool 130 is stored. During the generation of the model, various parameters, including consumable item characteristics such as the age of the consumable item, and the resulting processing rate measurements recorded by the metrology tools 120, 140, are used to develop a predictive model of processing rate and operating recipe parameters required to achieve a target output thickness. In block 210, a consumable item characteristic (e.g., age) is received (i.e., based on either manual or automatic input). The particular data received in block 210 will vary depending on the particular process under consideration. A predicted processing rate is determined based on the consumable item characteristic and the performance model in block 220. Operating recipe parameters may be set for the processing tool 130 based on the predicted processing rate. The wafers 110 are processed in the processing tool 130 based on the operating recipe parameters in block 230. In block 240, the actual processing rate of the processing tool 130 is determined on a periodic basis by the metrology tools 120, 140 to provide feedback for the performance model. In block 250, the replacement interval for the consumable item is determined based on the actual processing rate. In one embodiment, the predicted processing rate may also be used in determining the replacement interval. In still another embodiment, the automatic process controller 150 may also consider scheduling information in its decision making process for determining the replacement interval for the consumable item.

Determining the replacement intervals for consumable items using the modeling and actual measurement techniques described above improves the efficiency of the processing line 100 and the efficiency at which the consumable items are used. The service life of better-performing consumables will be extended without losing the ability to identify poorer-performing consumable items prior to failure. This improves efficiency at both the tool level and the line level.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for monitoring consumable performance in a processing tool, comprising:
   storing a performance model of the processing tool;
   receiving a consumable item characteristic of a consumable item in the processing tool;
   determining a predicted processing rate for the processing tool based on the consumable item characteristic and the performance model;
   determining an actual processing rate of the processing tool; and
   determining a replacement interval for the consumable item based on at least the actual processing rate.

2. The method of claim 1, wherein determining the actual processing rate includes:
   processing wafers in the processing tool; and
   measuring a characteristic of the processed wafers to determine the actual processing rate.

3. The method of claim 1, further comprising determining operating recipe parameters for the processing tool based on the predicted processing rate.

4. The method of claim 1, wherein determining the replacement interval for the consumable item includes determining the replacement interval based on the actual processing rate and the predicted processing rate.

5. The method of claim 1, further comprising receiving scheduling information associated with the processing tool, and wherein determining the replacement interval for the consumable item includes determining the replacement interval based on the actual processing rate and the scheduling information.

6. The method of claim 1, wherein the processing tool comprises a polishing tool including a polishing pad and determining the replacement interval for the consumable item includes determining the replacement interval for the polishing pad.

7. The method of claim 1, wherein the processing tool comprises a polishing tool including a carrier and determining the replacement interval for the consumable item includes determining the replacement interval for the carrier.

8. The method of claim 1, wherein the processing tool comprises a sputter deposition tool including a target and determining the replacement interval for the consumable item includes determining the replacement interval for the target.

9. The method of claim 1, wherein receiving the consumable item characteristic includes receiving an age of the consumable item.

10. The method of claim 2, wherein determining the actual processing rate includes measuring a characteristic of the wafers prior to being processed in the processing tool.

11. The method of claim 2, further comprising updating the performance model based on the characteristic of the processed wafers.

12. The method of claim 3, further comprising processing wafers in the processing tool based on the operating recipe parameters.

13. The method of claim 5, wherein receiving the scheduling information includes monitoring the idle time of the processing tool.

14. A processing system, comprising:
   a processing tool adapted to process wafers, the processing tool including a consumable item; and
   a processing device programmed with instructions that, when executed, perform a method for monitoring consumable performance in the processing tool, the method including:
      storing a performance model of the processing tool;
      receiving a consumable item characteristic of a consumable item in the processing tool;
      determining a predicted processing rate for the processing tool based on the consumable item characteristic and the performance model;
      determining an actual processing rate of the processing tool; and
      determining a replacement interval for the consumable item based on at least the actual processing rate.

15. The processing system of claim 14, further comprising a first metrology tool adapted to measure a characteristic of the processed wafers to determine the actual processing rate.

16. The processing system of claim 14, wherein the processing tool is adapted to process the wafers based on operating recipe parameters, and the method further comprises determining the operating recipe parameters based on the predicted processing rate.

17. The processing system of claim 14, wherein determining the replacement interval for the consumable item in the method includes determining the replacement interval based on the actual processing rate and the predicted processing rate.

18. The processing system of claim 14, wherein the method further comprises receiving scheduling information associated with the processing tool, and wherein determining the replacement interval for the consumable item includes determining the replacement interval based on the actual processing rate and the scheduling information.

19. The processing system of claim 14, wherein the processing tool comprises a polishing tool including a polishing pad and determining the replacement interval for the consumable item includes determining the replacement interval for the polishing pad.

20. The processing system of claim 14, wherein the processing tool comprises a polishing tool including a carrier and determining the replacement interval for the consumable item includes determining the replacement interval for the carrier.

21. The processing system of claim 14, wherein the processing tool comprises a sputter deposition tool including a target and determining the replacement interval for the consumable item includes determining the replacement interval for the target.

22. The processing system of claim 14, wherein the consumable item characteristic comprises an age of the consumable item.

23. The processing system of claim 15, further comprising a second metrology tool adapted to measure a characteristic of the wafers prior to being processed in the processing tool.

24. The processing system of claim 15, further comprising updating the performance model based on the characteristic of the processed wafers.

25. The processing system of claim 18, wherein receiving the scheduling information in the method includes monitoring the idle time of the processing tool.

26. A processing system, comprising:
   a processing tool adapted to process wafers, the processing tool including a consumable item; and
   an automatic process controller adapted to store a performance model of the processing tool, receive a consumable item characteristic of the consumable item in the processing tool, determine a predicted processing rate for the processing tool based on the consumable item characteristic and the performance model, determine an actual processing rate of the processing tool, and determine a replacement interval for the consumable item based on at least the actual processing rate.

27. The processing system of claim 26, further comprising a first metrology tool adapted to measure a characteristic of the processed wafers to determine the actual processing rate.

28. The processing system of claim 26, wherein the processing tool is adapted to process the wafers based on operating recipe parameters, and the automatic process controller is further adapted to determine the operating recipe parameters based on the predicted processing rate.

29. The processing system of claim 26, wherein the automatic process controller is adapted to determine the replacement interval based on the actual processing rate and the predicted processing rate.

30. The processing system of claim 26, wherein the automatic process controller is adapted to receive scheduling information associated with the processing tool and determine the replacement interval for the consumable item includes based on the actual processing rate and the scheduling information.

31. The processing system of claim 26, wherein the processing tool comprises a polishing tool including a polishing pad, and the automatic process controller is adapted to determine the replacement interval for the for the polishing pad.

32. The processing system of claim 26, wherein the processing tool comprises a polishing tool including a carrier, and the automatic process controller is adapted to determine the replacement interval for the carrier.

33. The processing system of claim 26, wherein the processing tool comprises a sputter deposition tool including a target, and the automatic process controller is adapted to determine the replacement interval for the target.

34. The processing system of claim 26, wherein the consumable item characteristic comprises an age of the consumable item.

35. The processing system of claim 27, further comprising a second metrology tool adapted to measure a characteristic of the wafers prior to being processed in the processing tool.

36. The processing system of claim 27, wherein the automatic process controller is further adapted to update the performance model based on the characteristic of the processed wafers.

37. The processing system of claim 30, wherein the automatic process controller is adapted to monitoring the idle time of the processing tool.

38. A processing system, comprising:
    a processing tool adapted to process wafers, the processing tool including a consumable item;
    means for storing a performance model of the processing tool;
    means for receiving a consumable item characteristic of a consumable item in the processing tool;
    means for determining a predicted processing rate for the processing tool based on the consumable item characteristic and the performance model;
    means for determining an actual processing rate of the processing tool; and
    means for determining a replacement interval for the consumable item based on at least the actual processing rate.

* * * * *